United States Patent Office 3,647,854
Patented Mar. 7, 1972

3,647,854
PRODUCTION OF CYANOACETALDEHYDE
Hans Juergen Sturm and Herbert Armbrust, Grunstadt, Germany, assignors to Badische Anilin- & Soda-Fabrik Aktiengesellschaft, Ludwigshafen (Rhine), Germany
No Drawing. Filed Apr. 20, 1970, Ser. No. 30,287
Claims priority, application Germany, Apr. 22, 1969, P 19 20 246.1
Int. Cl. C07c 121/34
U.S. Cl. 260—465.1                    6 Claims

ABSTRACT OF THE DISCLOSURE

Production of cyanoacetaldehyde by splitting isoxazolines in the presence of inorganic bases. The product is a valuable intermediate in the manufacture of dyes and pesticides.

---

This invention relates to a process for the manufacture of cyanoacetaldehyde by splitting isoxazolines in the presence of inorganic bases.

It is known from Gazz. Chim. Ital., 85, 34 et seq. (1955) and Atti Accad. Naz Lincei, 6, 168 et seq. (1949), that cyanoacetaldehyde may be made by splitting isoxazole, which is in turn prepared by reacting propargyl alcohol or malonaldehyde bis-diethylacetal with hydroxylamine. This process uses starting materials which are not easily obtainable and provides unsatisfactory yields of the desired product.

It is an object of the invention to provide a novel process for producing cyanoacetaldehyde in a simpler manner, in better yields and in greater purity.

This and other objects and advantages of the invention are achieved by splitting isoxazolines of the general formula:

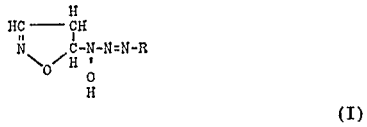

(I)

where R stands for an aromatic radical, or isoxazolines formed by reacting malonaldehyde dioxime with nitrous acid, said splitting being carried out in the presence of alkali metal oxides or hydroxides or alkaline earth metal oxides or hydroxides.

In the case of 5-(1'-phenyl-3'-hydroxy-triazenyl-(3'))-isoxazoline the reaction may be represented by the following formulae:

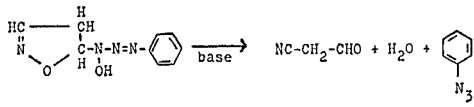

$$HON=CH-CH_2-CH=NOH+HNO_2 \rightarrow$$
$$NC-CH_2-CHO+2H_2O+N_2O$$

Compared with the previously known processes the process of the present invention, which uses more readily available starting materials, provides cyanoacetaldehyde in better yields and in greater purity in a simpler manner.

The starting materials used may be isoxazolines of the general Formula I, which may be prepared, for example, by reacting malonaldehyde dioxime with diazonium compounds, or isoxazolines formed by the reaction of malonaldehyde dioxime with nitrous acid. Preferred starting materials I are those of Formula I where R stands for a phenyl or naphthyl radical which is optionally substituted by groups and/or atoms which are inert under the conditions of reaction, for example by alkyl or alkoxy groups each of from 1 to 4 carbon atoms, and/or by chlorine atoms, bromine atoms, nitro groups, carboxyl groups or phenylazo groups. For example the following isoxazolines are suitable: 5 - (1' - phenyl - 3' - hydroxy-triazenyl-(3'))-isoxazoline and the analogous 1'-o, m and p-toluyl, 1'-o, m and p-chlorophenyl, 1'-m-nitrophenyl, 1'-o-methoxyphenyl, 1'-o-carboxyphenyl, 1'-p-xylyl, 1'-p-bromophenyl and 1'-α- and 1'-β-naphthyl derivatives.

Other preferred isoxazolines are those formed by reacting malonaldehyde dioxime with nitrous acid in a molar ratio of from 1:1 to 1:1.1. Nitrous acid may be conveniently formed in situ by using materials such as acetic acid, sulfuric acid, hydrochloric acid together with a nitrite such as sodium nitrite or potassium nitrite in stoichiometric amounts. The conversion to the isoxazoline is conveniently carried out at a temperature between 0° and 10° C., preferably between 0° and 5° C. at atmospheric or elevated pressure and continuously or batchwise in the presence of water as solvent. Usually, the product of the reaction is not isolated and, instead, the aqueous reaction mixture is used as it is as the starting material. Any residues of nitrous acid still present in the mixture are conveniently destroyed by the addition of appropriate amounts of urea. The isoxazoline used as starting material may for example be prepared as follows: a mixture of malonaldehyde, acid and water is prepared and a nitrite is added thereto portionwise during 10 to 30 minutes at the reaction temperature with thorough mixing. The resulting aqueous reaction mixture is then added portionwise as starting material to the aqueous inorganic base.

The starting isoxazolines are split in the presence of alkali or alkaline earth metal oxides or hydroxides, preferably in a molar ratio of from 1 to 3 moles of base per mole of isoxazoline or malonaldehyde dioxime. The following basic compounds are suitable, for example: potassium, strontium and calcium hydroxides, magnesium and calcium oxides and, in particular, sodium hydroxide.

Splitting is generally carried out at a temperature between 0° and 40° C. and preferably between 0° and 25° C., at atmospheric or elevated pressure and continuously or batchwise. Water is usually employed as solvent and, if desired, organic solvents such as alkanols may also be used, provided they are inert under the conditions of reaction.

Splitting may be carried out as follows: the isoxazoline of Formula I or the aqueous mixture obtained from the reaction of malonaldehyde dioxime with nitrous acid is added to the aqueous solution of the alkali metal or alkaline earth metal compound at the desired temperature of reaction. The isoxazoline of Formula I may be replaced by the mixture obtained from the reaction of malonaldehyde dioxime with diazonium salts. The alkaline reaction mixture is then maintained at the reaction temperature for a further 20 to 60 minutes with efficient stirring, whereupon the dinitrogen oxide or azide formed is separated and the end product, which is stable in alkaline solution and difficult to isolate, is detected by coupling with benzenediazonium chloride and is further processed without isolation.

The compound produced by the process of the invention is a valuable intermediate in the manufacture of dyes and pesticides. Thus for example, by reacting with phenyl hydrazines the corresponding hydrazones may be produced, for example the 4-nitrophenyl hydrazone (see for example Gazz. Chim. Ital., 77, 586 et seq. (1947)). These hydrazones may, like the cyanoacetone hydrazones (see for example Annalen der Chemie, 624, 1 et seq. (1959)), be cyclized to the corresponding 5-amino pyrazoles substituted in the 1-position. 1-phenyl-5-amino-pyrazoles, for example, are coupling components for dye (U.K. Pat. No. 837,716).

In the following examples the parts are by weight.

EXAMPLE 1

To 10.2 parts of malonaldehyde dioxime, 40 parts of water and 10 parts of glacial acetic acid there are added portionwise 7 parts of sodium nitrite in 20 parts of water during 15 minutes at a temperatture of from 0° to 5° C. with stirring. The nitrite residues are then destroyed by adding 1.5 parts of urea. The cold solution thus obtained is then added portionwise at 10–15° C. with cooling to 24 parts of a 20% w./w. aqueous solution of sodium hydroxide. Dinitrogen oxide is given off. When gas generation has ceased, the solution contains 6 parts of cyanoacetaldehyde (87% of theory). The yield of cyanoacetaldehyde is determined by coupling with benzenediazonium chloride to form the phenylazo cyanoacetaldehyde by the method described in Berichte der Deutschen Chemischen Gesellschaft, 36 3666 (1903).

EXAMPLE 2

To a mixture of 9.3 parts of aniline, 50 parts of water and 25 parts of 38% w./w. hydrochloric acid there is added a solution of 7 parts of sodium nitrite in 20 parts of water portionwise at 0–5° C. The resulting mixture is stirred for a further 30 minutes. Excess nitrite is destroyed by adding 0.5 part of urea. The diazonium salt solution is then added portionwise at 0–5° C. to a mixture of 10.2 parts of malonaldehyde dioxime, 50 parts of water and 20.5 parts of sodium acetate. The mixture is stirred for 30 minutes at 0–5° C. and for 30 minutes at room temperature before filtering. The solid residue is transferred with cooling to a mixture of 12 parts of 40% w./w. aqueous sodium hydroxide solution and 12 parts of water. The oil which separates is removed from the mixture and distilled. There are thus obtained 9.9 parts of phenyl azide, B.P. 53–54° C./12 mm. Hg (83.3% of theory). The aqueous portion contains 5.9 parts of cyanoacetaldehyde (85.5% of theory).

EXAMPLE 3

10.7 parts of m-toluidine are diazotized and reacted with malonaldehyde dioxime in a manner similar to that described in Example 2. The aqueous portion following alkaline splitting contains 6.2 parts of cyanoacetaldehyde (89.8% of theory).

EXAMPLE 4

12.75 parts of p-chloroaniline are diazotized and reacted with malonaldehyde dioxime as described in Example 2. The aqueous portion following alkaline splitting contains 5.9 parts of cyanoacetaldehyde (85.5% of theory).

EXAMPLE 5

12.3 parts of o-anisidine are diazotized, reacted with malonaldehyde dioxime and the reaction product subjected to alkaline splitting as described in Example 2. The aqueous solution contains 5.8 parts of cyanoacetaldehyde (84% of theory).

We claim:

1. A liquid phase process for the production of cyanoacetaldehyde which comprises splitting an isoxazoline of the formula

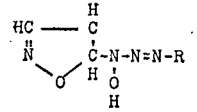

where R is phenyl, naphthyl, substituted phenyl or substituted naphthyl, wherein any substitutents are inert under the conditions of the reaction, said splitting being carried out in the presence of a basic compound wherein said basic compound is an alkali metal or alkaline earth metal oxide or hydroxide at a molar ratio of at least about 1 mole of said basic compound per mole of isoxazoline.

2. A process as claimed in claim 1 wherein said splitting is carried out at a temperature of from 0 to 40° C.

3. A process as claimed in claim 1 wherein said splitting is carried out at a temperature of from 0 to 25° C.

4. A process as claimed in claim 1 wherein said splitting is carried out in the presence of water as solvent.

5. A process as claimed in claim 1 wherein said splitting is carried out at a molar ratio of from 1 to 3 moles of basic compound per mole of isoxazoline.

6. A process as claimed in claim 1 wherein said splitting is effected with sodium hydroxide.

References Cited

UNITED STATES PATENTS 3,517,047   6/1970   Ohno et al. _____ 260—465.9

OTHER REFERENCES

D'Alcontres et al., C.A., 46, p. 495 (1952).

JOSEPH P. BRUST, Primary Examiner

U.S. Cl. X.R.

260—349